United States Patent [19]

Kutaragi

[11] 4,210,934
[45] Jul. 1, 1980

[54] VIDEO DISPLAY APPARATUS HAVING A FLAT X-Y MATRIX DISPLAY PANEL

[75] Inventor: Ken Kutaragi, Kawasaki, Japan

[73] Assignee: Sony Corporation, Tokyo, Japan

[21] Appl. No.: 12,577

[22] Filed: Feb. 15, 1979

[30] Foreign Application Priority Data

Feb. 16, 1978 [JP] Japan .................................. 53-16934

[51] Int. Cl.² .......................... H04N 3/14; H04N 5/70
[52] U.S. Cl. .................................................... 358/241
[58] Field of Search ............................... 358/230, 241

[56] References Cited

U.S. PATENT DOCUMENTS

| | | | |
|---|---|---|---|
| 3,761,617 | 9/1973 | Tsuchiya et al. | 358/241 |
| 3,765,011 | 10/1973 | Sawyer et al. | 358/241 |
| 4,110,662 | 8/1978 | Greeneich et al. | 358/241 |

FOREIGN PATENT DOCUMENTS

2537812  3/1976  Fed. Rep. of Germany ........... 358/241

*Primary Examiner*—Richard Murray
*Assistant Examiner*—Michael A. Masinick
*Attorney, Agent, or Firm*—Lewis H. Eslinger; Alvin Sinderbrand

[57] ABSTRACT

Video display apparatus having a flat X-Y matrix display panel comprised of an X-Y array of display elements for displaying a picture derived from a video signal. An analog-to-digital converter obtains m samples of a line of the video signal, each sample being formed of n bits of different bit levels from the least significant bit level to the most significant bit level. A memory stores each sample in a respective one of m storage locations, each storage location including n storage compartments for storing the n bits of a sample, respectively. All of the bits of one level are serially read out from the corresponding storage compartment in all of the n storage locations, and then all of the bits of the next level are read out from the corresponding storage compartment in all of the m storage locations, and so on, in succession, until the bits of all levels have been read out from the m storage locations. For example, all of the least significant bits of the m storage locations are read out serially, then the next more significant bits in all of the m storage locations are read out, and so on, until all of the most significant bits are read out of the m storage locations. An enabling circuit enables successive lines of the display elements in the display panel to be energized on a line-by-line sequential basis. An energizing circuit is supplied in parallel with the m bits of each bit level, sequentially by level, as the m bits read out from the storage locations, to energize selected ones of the displayed elements in an enabled line in accordance with the bit values of the read out bits. In the preferred embodiment, each bit level of read out bits is stored temporarily. As the significance of the bit level increases, the storage time for such bits likewise increases. Hence, the least significant bits are temporarily stored for the shortest time period and the most significant bits are stored for the longest time period.

18 Claims, 15 Drawing Figures

VIDEO DISPLAY APPARATUS HAVING A FLAT X-Y MATRIX DISPLAY PANEL

BACKGROUND OF THE INVENTION

This invention relates to a video display system employing a flat X-Y matrix display panel and, more particularly, to such display apparatus which is of relatively simple construction, is far easier to assemble and is of lower cost than prior art apparatus.

Various proposals have been made for video display apparatus which include flat display panels in place of the usual cathode ray tube (CRT) now conventionally used in television receivers. The advantages of using a flat display panel are that a much more compact design can be attained, the overall television receiver can be constructed of solid state circuitry, the extremely high voltages commonly used in a CRT can be avoided, and others.

In operating a flat panel video display apparatus, a line of the received video signal is sampled a number of times during the line interval, and each sample is used to drive a corresponding display element associated with that line. Hence, depending upon the level of the sampled video signal, the intensity of the light emitted by the respective display elements will be of a corresponding brightness. Then, after one line interval is sampled, the next line is similarly sampled so as to correspondingly energize those display elements which are associated with the next line. This operation continues until a field or frame interval has been sampled and displayed.

In the foregoing example, each sample may be an analog sample, and complex analog switching techniques may be used to energize the appropriate display elements with the appropriate analog samples. It is through that generally better results can be achieved by driving the display elements in accordance with digital techniques. In one prior art flat panel display apparatus, the received video signal is sampled a number of times during a line interval, and each sample is digitized to, for example, an 8-bit word. The 8-bit word is transferred, for example, parallel-by-bit, to a memory which is capable of storing all of the 8-bit words which are produced during the sampling of the line interval. For example, 256 samples may be obtained, thus requiring a memory having a capacity to store 256 8-bit words.

Consistent with obtaining 256 samples during a line interval, the display panel may be comprised of a number of lines of display elements, each line containing 256 display elements. Once all of the samples for a line interval have been stored in the memory, they are read out to energize the corresponding display elements in a line of the display panel. Thus, sample No. 1 is read out to energize display element No. 1, sample No. 2 is read out to energize display element No. 2, and so on. Each 8-bit sample, when read out, must be effectively converted to a form whereby the brightness of the intensity of light emitted by the respective display elements is determined by the equivalent magnitude represented by the 8-bit word. This is attained by reading out each 8-bit word in a manner that is equivalent to pulse width modulation. Since each 8-bit word is constituted by bits of different bit levels ranging from the least significant bit to the most significant bit, those bits of lesser significance are read out from the memory with relatively short delays, while those bits of greater significance are read out with correspondingly greater delays. Hence, the duration that a display element is energized by a bit of greater significance, i.e., higher bit level, is far greater than the duration that the element is energized by a bit of lesser significance. The intensity of the light that is emitted by the element and perceived by a viewer appears greater if the element is energized for a longer duration.

Based upon the foregoing, the contents of the memory, which represents the digitized samples of one line interval of video signals, are read out in successive groups of bits, each group being constituted by 256 bits all of the same bit level. Furthermore, the rate at which these bits are read out of the memory changes, i.e., decreases, as the bit level increases. Hence, after all 256 8-bit words are stored in the memory, all of the least significant bit levels are read out in parallel, then all of the next more significant bits are read out in parallel, followed by all of the next more significant bits, and so on, until, finally, all of the most significant bits are read out in parallel. A temporary storage device, such as a latch circuit, may be provided to temporarily store the parallel bits which are read out, in succession, from the memory. Hence, the duration that each group of read out bits is stored is a function of the bit level of those bits. This results in pulse width modulation of the intensity of light emitted by the respective display elements in a line of the display panel, and is perceived as a brightness modulation by the viewer.

After one line of samples is read out of the memory, the next line is written in. Also, after all of the bits in the previous line have been used to energize the line of display elements of the display panel, the next line of display elements is enabled so that they can be energized in a similar manner. By enabling successive lines of display elements, a line-by-line raster is displayed, thereby forming a video picture corresponding to the video information contained in the received video signal.

In the flat panel display apparatus of the aforedescribed type, the samples stored in the memory cannot be read out therefrom until the memory has been filled, that is, until a line interval of video signals has been completely sampled. Also, write-in and read-out operations cannot be carried on simultaneously. Thus, in the prior art apparatus, video information is written into the memory during one line interval, and that information is read out from the memory during the next line interval. This means that only alternate line intervals are sampled and displayed. However, generally, this does not significantly detract from the quality of the video picture which ultimately is displayed. One problem, however, with this prior art apparatus, is that the memory typically is formed as a serial/parallel shift register, each stage of which is formed of about fifty circuit elements. Hence, the number of circuit elements which are needed to construct the shift register is about 256 × 8 × 50 which is in excess of 100,000. It is difficult to fabricate such a shift register as an integrated circuit. Accordingly, this shift register is formed of a number of individual circuit chips. However, the number of such chips is so large that it is not practical to mount them on the very same circuit board on which the display elements and associated drive circuitry are mounted. This means that the shift register is mounted on a separate circuit board and must be connected to the circuit board on which the display elements are mounted by individual conducting leads. Since the bits of the same bit level in all 256 samples are read out from the shift register in parallel, 256 individual conducting leads are needed to connect the circuit board on which the shift register is mounted to the circuit board on which the display elements are mounted. It is quite time-consuming, and thus expensive, to provide these 256 individual connections. Furthermore, it is relatively easy to misconnect one output terminal from one circuit board to another input terminal of the other circuit board. This, of course, can result in deleterious operation of the display apparatus.

OBJECTS OF THE INVENTION

Therefore, it is an object of the present invention to provide improved flat panel display apparatus which avoids the problems attending the aforementioned prior art apparatus.

Another object of this invention is to provide flat panel display apparatus wherein the memory into which digitized samples of a received video signal are written and out of which such samples are read can be mounted on the very same circuit board as are the elements of the display panel.

A further object of this invention is to provide a flat panel display apparatus of the aforenoted type wherein the digitized samples are written into the memory serial-by-bit and are read out from the memory also in serial-by-bit format.

An additional object of this invention is to provide flat panel display apparatus of the aforenoted type wherein the memory is constituted by a random access memory (RAM).

Yet another object of this invention is to provide improved flat panel display apparatus of the aforenoted type wherein the number of conducting leads which are needed to connect the memory to various circuit elements is significantly reduced, thereby simplifying the construction of the apparatus without deleteriously affecting the overall picture quality which can be obtained therefrom.

Various other objects, advantage and features of the present invention will become readily apparent from the ensuing detailed description, and the novel features will be particularly pointed out in the appended claims.

SUMMARY OF THE INVENTION

In accordance with this invention, video display apparatus having a flat X-Y matrix display panel comprised of an X-Y array of display elements is provided for displaying a picture derived from a received video signal. An analog-to-digital converter obtains m samples of a line of the video signal, each sample being formed of n bits of different bit levels from the least significant bit level to the most significant bit level. Each sample is stored in a memory in a respective one of m storage locations; each storage location including n storage compartments for storing the n bits of a sample, respectively. A read-out circuit serially reads out all of the bits of one level from the corresponding storage compartment in all of the n storage locations, and then serially reads out all of the bits of the next level from the corresponding storage compartment in all of the m storage locations, and so on, in succession, until the bits of all levels have been read out. Each line of display elements in the display panel is enabled on a sequential line-by-line basis, and as all of the m bits of a bit level are read out, they are used to energize the display elements in the enabled line. Preferably, as the significance of the bit levels of the bits which are read out of the memory increases, the time duration separating the reading out of one bit level from the next higher bit level also increases. This means that the duration over which the more significant bit levels are used to energize the display elements is greater than the duration over which the lesser significant bit levels are used, thus increasing the perceived intensity of the light emitted by those elements when energized by the bits of greater bit level significance.

BRIEF DESCRIPTION OF THE DRAWINGS

The following detailed description, given by way of example, will best be understood in conjunction with the accompanying drawings in which.

DETAILED DESCRIPTION OF THE PREFERRED EMBODIMENTS

Figure 1:
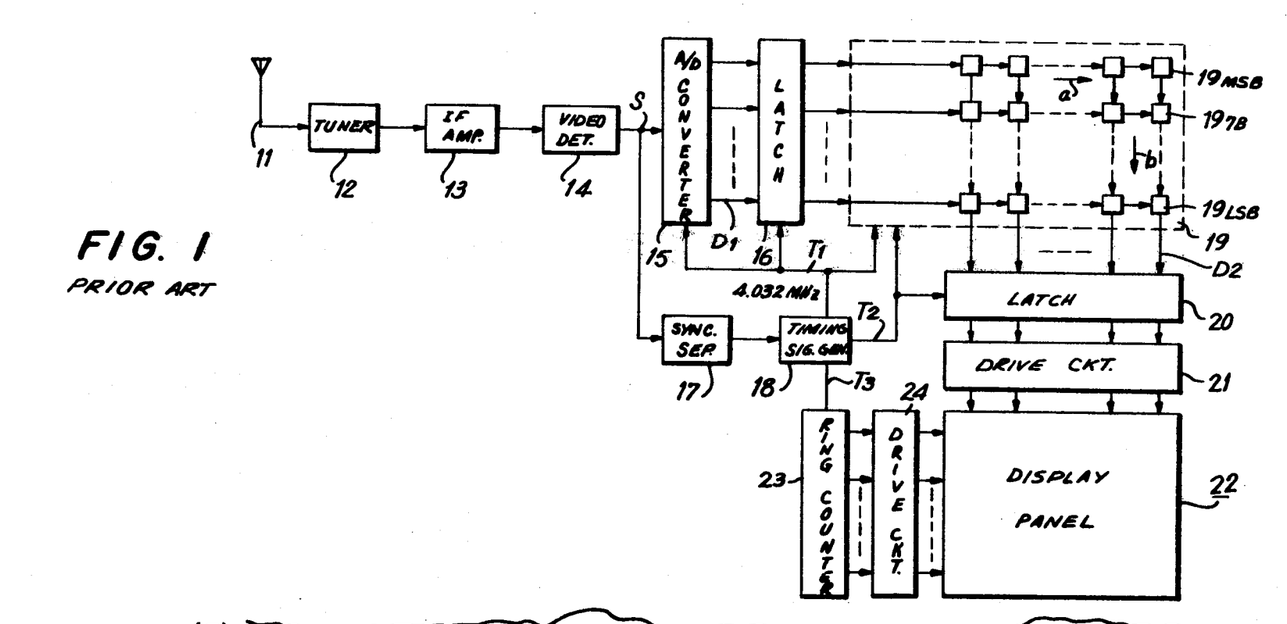
FIG. 1 is a block diagram of a prior art example of a video display apparatus having a flat display panel.

Referring now to the drawings, wherein like reference numerals are used throughout, reference first is made to FIG. 1 which is illustrative of one example of prior art video display apparatus having a flat display panel. The illustrated apparatus is shown in the environment of a television receiver wherein a broadcasted video signal is received at, for example, an antenna 11. Such apparatus includes a tuner 12, a video IF amplifier 13, and a video detector 14. These circuits are connected in series, as shown, and are well known to those of ordinary skill in the art. Suffice it to say that a video signal S is produced at the output of video detector 14. Since tuner 12, video IF amplifier 13 and video detector 14 are well known in the art, further description of these components is not provided.

The video information contained in video signal S is displayed on display panel 22. This display panel is a flat X-Y matrix formed of an X-Y array of display elements. These elements are energizable light emitting devices which, when energized, emit light of a perceived intensity that is a function of the magnitude of the energizing voltage for the duration that such voltage is applied. Each line, or row, of display elements is enabled sequentially on a line-by-line basis. When a particular line of display elements is enabled, selected ones of those enabled elements then can be energized. The enabling of the successive lines of display elements is carried out in synchronism with the horizontal line frequency of the received video signal. Thus, a raster of energized elements is formed on display panel 22 corresponding to the video information contained in the received video signal.

The apparatus which is used to enable and energize the lines of display elements included in display panel 22 now will be described. The enabling circuitry is comprised of synchronizing signal separator 17, a timing signal generator 18, a ring counter 23 and drive circuits 24. Synchronizing separator circuit 17 is connected to the output of video detector 14 and is adapted to separate the horizontal synchronizing signal from the received video signal S. The output of synchronizing separator circuit 17 is connected to timing signal generator 18 which generates various timing signals synchronized with the separated horizontal synchronizing signal. One output of timing signal generator 18 is connected to ring counter 23. The ring counter is a conventional ring counter device having a plurality of outputs which are individually energized in sequence. In response to each timing pulse supplied to ring counter 23, the next successive output thereof is energized. These outputs of ring counter 23 are connected to corresponding inputs of drive circuit 24, the latter being connected to enable the associated lines of display elements in display panel 22. Thus, depending upon which output of ring counter 23 is energized, the associated line of display elements is enabled.

The energizing circuitry for the display elements included in display panel 22 is comprised of an analog-to-digital (A/D) converter 15, a latching circuit 16, a memory device 19, a latching circuit 20 and a drive circuit 21. A/D converter 15 is coupled to video detector 14 and is adapted to sample video signal S. A sampling input of A/D converter 15 is connected to an output of timing signal generator 18 for receiving, for example, 256 sampling pulses during a horizontal line interval. Hence, A/D converter 15 functions to obtain 256 samples during a line interval of the video signal. Each sample is digitized such that the sampled amplitude of the video signal is represented by an 8-bit word.

A/D converter 15 includes a plurality of output terminals, for example 8 output terminals, connected to latching circuit 16. A latch control input of latching circuit 16 is connected to timing signal generator 18 and, when a latch control signal is received, the bits supplied to the latching circuit by A/D converter 15 are latched, or stored therein. Each 8-bit digitized sample produced by A/D converter 15 is supplied in parallel to latching circuit 16. These 8 bits are of 8 different bit levels, respectively. That is, these bit levels range from the least significant bit (LSB) to the most significant bit (MSB). Of course, each bit value either is a binary "1" or a binary "0". Depending upon the amplitude of the sampled video signal S, a binary "1" or a binary "0" is provided in each bit level of the 8-bit word. The lowest analog amplitude level is represented by (00000000) and the maximum video signal amplitude is represented by (11111111).

Memory device 19 is adapted to store all of the 8-bit samples which are produced during a line interval. In the aforementioned example, it is assumed that 256 samples of the video signal are obtained during a line interval. Hence, memory device 19 is adapted to store 256 8-bit words. The storage capacity of this memory device thus is equal to $256 \times 8 = 2048$. Memory device 19 is provided with 8 input terminals connected to the 8 output terminals of latching circuit 16, respectively. Each 8-bit word is transferred in parallel from the latching circuit to the memory device.

Memory device 19 is comprised of 8 separate serial/parallel shift registers, each such register being formed of 256 stages, and each register being adapted to receive a predetermined bit level. For example, shift register $19_{LSB}$ is adapted to receive the least significant bit in each of the 256 samples, and shift register $19_{MSB}$ is adapted to receive the most significant bit in each of the 8-bit samples. The remaining shift registers are adapted to receive the bits of corresponding bit levels in each of the 256 samples, and the next most significant bit (designated bit 7B) is received by shift register $19_{7B}$. A write-in timing input of memory device 19 is connected to timing signal generator 18. A read-out timing input of the memory device is connected to another output of timing signal generator 18 for receiving read-out timing pulses therefrom. As may be appreciated, during a write-in operation, the respective bits of each 8-bit word are shifted in the direction of arrow a through shift registers $19_{LSB} \ldots 19_{MSB}$, respectively.

Memory device 19 includes 256 output terminals, each output terminal being connected to a respective stage of shift register $19_{LSB}$. During a read-out operation, the contents of each shift register are shifted in the direction of arrow b such that all of the bits of one bit level are shifted in parallel to the shift register associated with the next lower bit level. For example, all 256 bits included in shift register $19_{MSB}$ are shifted into shift register $19_{7B}$ while, concurrently, all of the bits which had been stored in shift register $19_{7B}$ are shifted into shift register $19_{6B}$, and so on. The 256 output terminals of memory device 19 are connected to respective inputs of a latching circuit 20. Thus, in the aforementioned read-out operation, wherein the bits are shifted in the direction of arrow b from one shift register to the next, all of the bits of least significance, that is, all of the least significant bits stored in shift register $19_{LSB}$, are shifted parallely into latching circuit 20. A latch control input of latching circuit 20 is connected to an output of timing signal generator 18 for receiving a latching signal therefrom. The 256 bits which are supplied to the latching circuit from memory device 19 are latched therein in response to this latching signal. The latching circuit also includes 256 output terminals which are connected to respective input terminals of drive circuit 21. The latter is adapted to drive respective columns of display elements included in display panel 22. When an energizing voltage is supplied to a particular display element by drive circuit 21, that display element is energized if it is concurrently enabled by drive circuit 24. Thus, since the display elements are arranged in row and column form, drive circuit 24 is used to enable respective rows of display elements, while drive circuit 21 is used to energize respective columns. This, of course, is conventional and need not be described in greater detail.

Figures 2A, 2B:
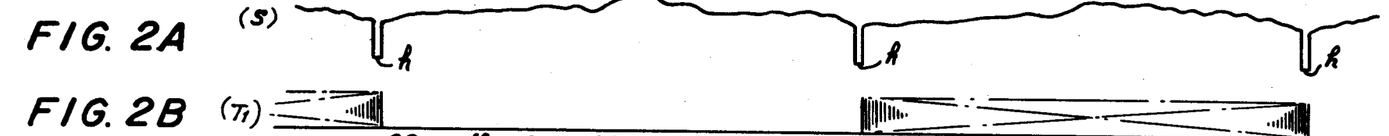
FIGS. 2A–2D are waveform diagrams which are useful in understanding the operation of the example shown in FIG. 1.

The operation of the prior art example shown in FIG. 1 now will be described with reference to the waveform diagrams of FIGS. 2A–2D. Video signal S is represented in FIG. 2A, and the horizontal synchronizing signals h included in the video signal are shown as negative-going pulses. As mentioned above, write-in and read-out operations for memory device 19 are carried out alternately. That is, during one line interval, digitized samples of the video signal are written into the memory device, and during the next line interval, these stored digitized samples are read out. FIG. 2B represents timing pulses $T_1$ which are generated by timing signal generator 18 in synchronism with the horizontal synchronizing pulses h. 256 timing pulses are generated during each alternate line interval. These timing pulses $T_1$ are supplied to A/D converter 15 to obtain 256 samples of video signal S. Each sample is formed of 8 bits, and each 8-bit sample, or word $D_1$, is transferred in parallel to latching circuit 16, also in response to the timing pulse $T_1$. The 8-bit word $D_1$ is temporarily stored in latching circuit 16 and then transferred, parallel-by-bit, to the first stage in each of shift registers $19_{LSB}$ ... $19_{MSB}$ of memory device 19, in response to a timing pulse $T_1$. The sequence of operations thus far described is to obtain an 8-bit sample of video signal S, transfer this sample to latching circuit 16 for temporary storage therein, and then to transfer this temporarily stored sample to memory device 19. In response to successive timing pulses $T_1$, each of the 256 samples are obtained and then shifted into the memory device. At the end of the sampled line interval, shift register $19_{LSB}$ includes the least significant bit in each of the 256 samples, and shift register $19_{MSB}$ includes the most significant bit of each of these samples. The intermediary shift registers $19_{2B}$ (not shown) ... $19_{7B}$ store the remaining bit levels of progressively increasing significance of these 256 samples.

Figure 2C:
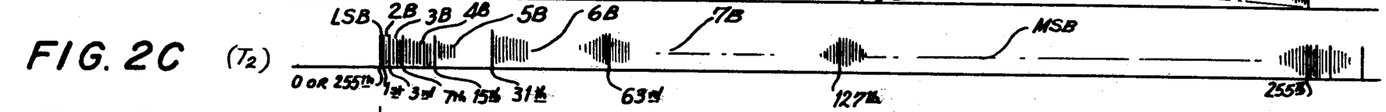

After a line interval of video signals has been sampled and all of the samples stored in memory device 19, the memory device undergoes a read-out operation. Timing signal generator 18 generates 255 timing pulses during a period constituted by two line intervals. These timing pulses are illustrated in FIG. 2C. Suitable gating circuitry is provided in the timing signal generator so as to produce output pulses $T_2$ corresponding to the 0th, first, third, seventh, fifteenth, thirty-first, sixty-third and one hundred twenty-seventh timing pulses, respectively, all as indicated by the dark pulses shown in FIG. 2C. These timing pulses $T_2$ are supplied to memory device 19 and also to latching circuit 20. In response to each such timing pulse, the contents of all of the registers are shifted by one level in the direction indicated by arrow b. At the same time, the contents of shift register $19_{LSB}$ are shifted, in parallel, to latching circuit 20. Thus, in response to the 0th timing pulse, all of the least significant bits are shifted from shift register $19_{LSB}$ into latching circuit 20, all of the bits of the next more significant level (level 2B) are shifted into register $19_{LSB}$, and all of the bits of the next higher significant bit levels are shifted into the shift registers associated with the next lower significant bit levels. Hence, the most significant bits in all 256 samples are shifted from shift register $19_{MSB}$ into shift register $19_{7B}$. In response to the first timing pulse $T_2$, the contents of the shift registers included in memory device 19 again are shifted in the direction indicated by arrow b into those shift registers associated with bit levels of the next lower significance. Hence, in response to the first timing pulse $T_2$, all of the bits of significance 2B are shifted into latching circuit 20. This operation is repeated for each of the third, seventh, fifteenth, thirty-first, sixty-third and one hundred twenty-seventh timing pulses $T_2$. Thus, as represented by FIG. 2C, in response to the third timing pulse $T_2$, all of the bits of bit level 3B are shifted into latching circuit 20. In response to the seventh timing pulse $T_2$, all of the bits of bit level 4B are shifted into this latching circuit. In response to the fifteenth timing pulse $T_2$, all of the bits of bit level 5B are shifted into latching circuit 20. In response to the thirty-first timing pulse $T_2$, all of the bits of bit level 6B are shifted into the latching circuit. In response to the sixty-third timing pulse $T_2$, all of the bits of bit level 7B are shifted into the latching circuit; and in response to the one hundred twenty-seventh timing pulse $T_2$, all of the bits of the most significant bit level are shifted into the latching circuit.

It is seen that the bits of the least significant bit level are stored in latching circuit 20 for the duration of the 0th to the first timing pulse. This is equal to a time duration of $1/255 \times 2H$ (wherein H is the duration of a horizontal line interval). Thus, the least significant bit in each of the 256 samples energizes respective display elements in the enabled line of elements for a duration $2H/255$. The bits of the next more significant bit level, bit level 2B, are stored in latching circuit 20 for the duration between the first and third timing pulses, or $2/255 \times 2H$. These next more significant bits thus energize the respective display elements in the enabled line of elements for a duration $4H/255$. The next more significant bits of bit level 3B are stored in latching circuit 20 for the interval from the third to the seventh timing pulse. This interval is equal to $4/255 \times 2H$. Hence, the bits of bit level 3B energize the display elements in the enabled line of elements for a duration $8H/255$. It is, therefore, appreciated that the bits of all of the 256 samples of the next higher significant bit levels energize the display elements in the enabled line of elements for progressively increasing durations. Bits of bit level 4B energize these display elements for the duration $16H/255$; bits of bit level 5B energize these display elements for the duration $32H/255$; bits of bit level 6B energize the display elements for the duration $64H/255$; bits of bit level 7B energize these display elements for the duration $128H/255$; and the most significant bits energize these display elements for the duration $256H/255$. Thus, as bits of higher significant bit levels are read out of memory device 19 and stored in latching circuit 20, the corresponding display elements are energized for progressively increasing durations of time. This results in a pulse width modulated intensity of the energized display elements, whereby those samples which represent higher video signal amplitudes produce greater intensities of perceived brightness. Although the most significant bit of a sample and the least significant bit of that sample both may be a binary "1", it is appreciated that the intensity of brightness which is perceived when a display element is energized by the most significant bit is far greater than the intensity which is perceived when that element is energized by the least significant bit. That is, the brightness which is perceived is a function of the weighting of the particular bits of the 8-bit sample.

As shown in FIG. 2C, the one hundred twenty-seventh timing pulse $T_2$ which is used to read out the most significant bits of all of the 256 samples from memory device 19 to latching circuit 20 occurs prior to the next following line interval which is sampled and written into the memory device. The memory device thus is cleared prior to the next write-in operation. Furthermore, the most significant bits are stored in latching circuit 20 for a duration that is slightly greater than a line interval.

Figure 2D:
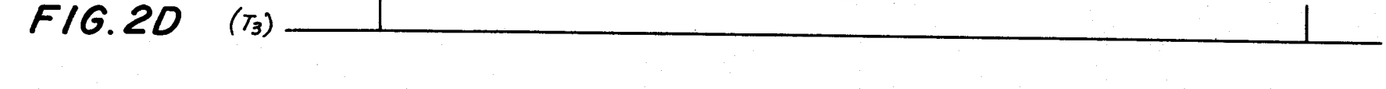

FIG. 2D represents timing pulses $T_3$ having a frequency that is one-half the horizontal line frequency. Each timing pulse $T_3$ increments ring counter 23, whereupon the next successive line of display elements in display panel 22 is enabled. Hence, alternate line intervals of the video signal are sampled and written into memory device 19, and these alternate line intervals are synchronously read out of the memory device and displayed on flat display panel 22. As an example, display panel 22 may be comprised of 120 lines of display elements; and ring counter 23 may be formed with 120 stages. One of these 120 lines of display elements is enabled at every other horizontal line interval. Ring counter 23 thus is incremented, or stepped, so that display panel 22 displays the video information contained in each field interval of received video signals.

Figure 3:
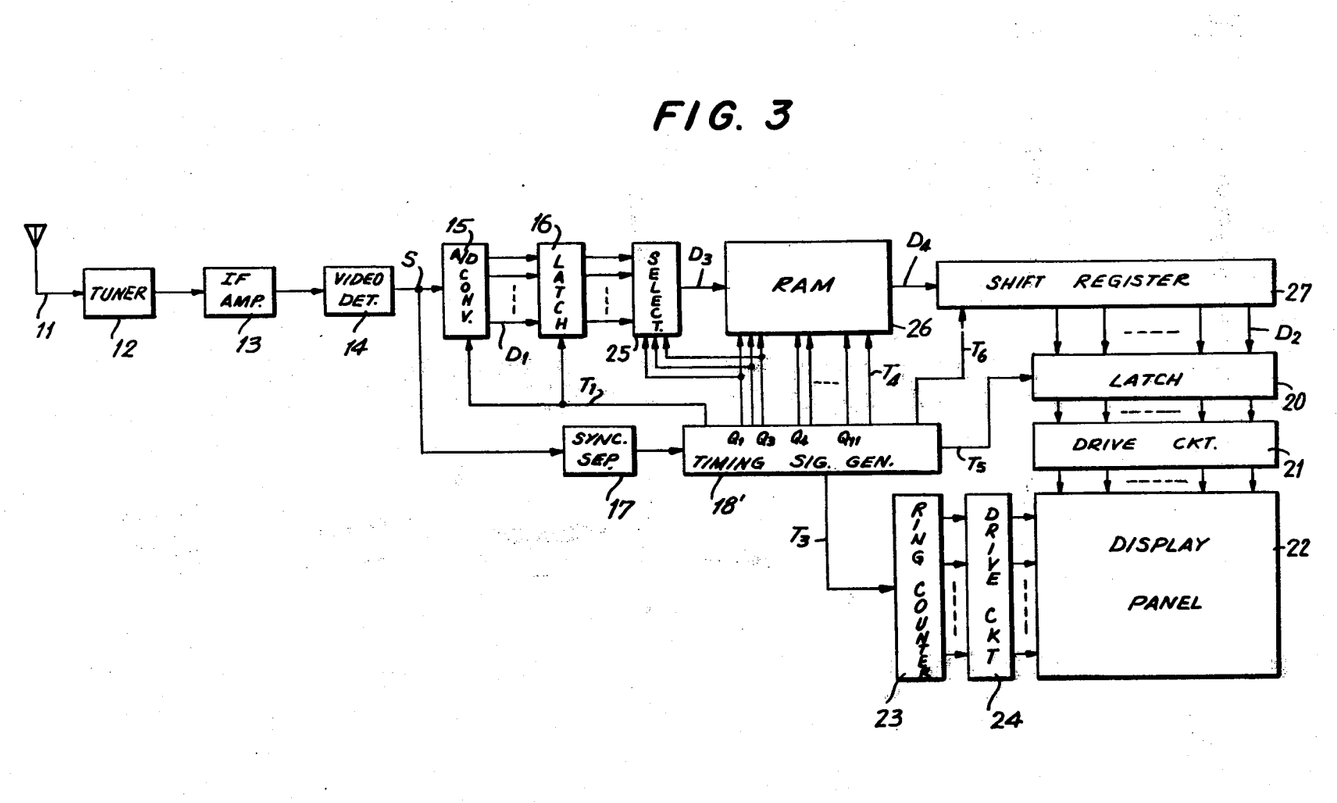
FIG. 3 is a block diagram of video display apparatus having a flat display panel in accordance with one embodiment of the present invention.

Turning now to FIG. 3, there is illustrated one embodiment of the present invention, wherein those devices which are similar to the aforedescribed devices of FIG. 1 are identified by the same reference numerals. The difference between the embodiment shown in FIG. 3 and the prior art example of FIG. 1 is that memory device 19 has been replaced by a random access memory (RAM) 26, the output of this RAM being connected to a shift register 27, and the output of this shift register is connected to latching circuit 20. In addition, a selector circuit 25 is provided between latching circuit 16 and RAM 26. Furthermore, timing generator 18 is shown in FIG. 3 as timing generator 18' which, in addition to generating the aforementioned timing signals $T_1$ and $T_3$ also generates timing signals $T_4$-$T_6$, and write-/read signals $Q_1$-$Q_{11}$. RAM 26 is a conventional random access memory device formed of, for example m storage locations, each storage location having n storage compartments. Digital signals are written into RAM 26 and read out of the RAM in serial-by-bit format. The RAM includes compartment address inputs and location address inputs for receiving compartment and location addresses, respectively. These addresses are generated by timing signal generator 18'. As will be described, signals $Q_1$, $Q_2$ and $Q_3$ are utilized as compartment addresses; and signals $Q_4$-$Q_{11}$ are utilized as location addresses. RAM 26 additionally includes a write-/read control input connected to timing signal generator 18' to receive a write/read control signal $T_4$ which, as will be described below, has a frequency equal to one-half the horizontal line frequency and which, in one state, conditions the RAM for a write-in operation, and in another state, conditions the RAM for a read-out operation.

The input terminal of RAM 26 is coupled to selector circuit 25 for receiving the serialized samples $D_3$ which are supplied to the RAM by the selector circuit. Selector circuit 25 may comprise a parallel-to-serial converter for converting the eight bits which are received in parallel from latching circuit 16 to a serialized train of bits $D_3$. Selector circuit 25 includes timing control inputs connected to timing signal generator 18' for receiving signals $Q_1$, $Q_2$ and $Q_3$, these signals being utilized by the selector circuit for serializing the 8-bit word which is received from the latching circuit.

Shift register 27 may be a conventional m-bit shift register connected to RAM 26 for receiving the bits which are serially read out of the RAM. The shift register includes m output terminals which are connected to respective m input terminals of latching circuit 20.

Timing signal generator 18' is connected to synchronizing separator circuit 17 for generating the various timing signals, all in synchronism with the horizontal synchronizing pulses which are separated from the video signal by the synchronizing signal separator circuit. The timing signals which are generated by timing signal generator 18' are timing signals $T_1$ and $T_3$, as in the prior art example shown in FIG. 1, together with periodic write/read control pulse $T_4$, compartment address signals $Q_1$-$Q_3$ and location address signals $Q_4$-$Q_{11}$. Also generated are read-out shift pulses $T_6$ which, as will be described below, constitute 256 shift pulses generated during a period of those timing pulses which are used to produce latching pulses $T_5$, and latching pulses $T_5$. Shift pulses $T_6$ are supplied to shift register 27 during each read-out cycle; and latching pulses $T_5$ are supplied to latching circuit 20, also during each read-out cycle.

Figure 4A:
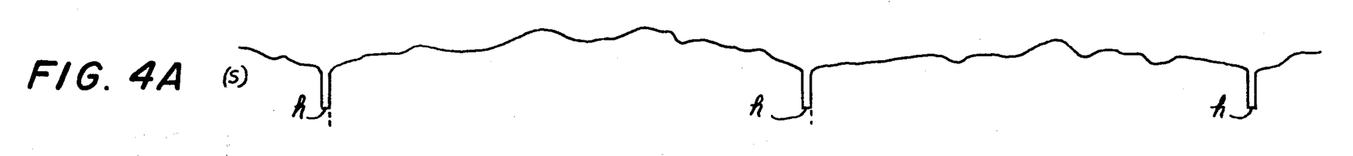
FIGS. 4A–4G are waveform diagrams which are useful in understanding the operation of the embodiment shown in FIG. 3.
Figures 4B, 4C, 4D:
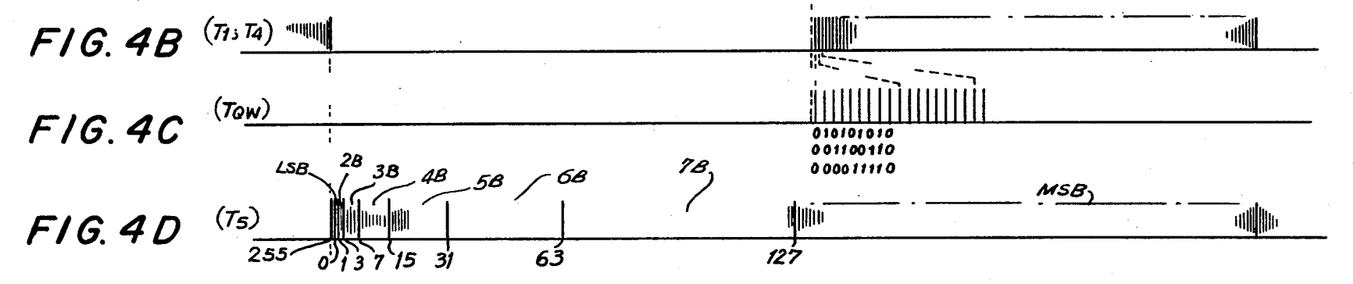

The manner in which the embodiment illustrated in FIG. 3 operates during a write-in cycle now will be described with reference to the waveforms illustrated in FIGS. 4A-4C. The video signal S, produced by video detector 14 and supplied to A/D converter 15 appears as shown in FIG. 4A. Timing pulses $T_1$, produced by timing signal generator 18', are shown in FIG 4B and are supplied to the A/D converter so as to obtain m samples during each alternate line interval. For the purpose of the illustrated embodiment, it is assumed that m=256, and that each sample is comprised of n bits, wherein n=8. These 8-bit samples, or words $D_1$, are supplied in parallel to latching circuit 16, as in the aforedescribed example shown in FIG. 1. Latching circuit 16 is responsive to each timing pulse $T_1$ to latch, or temporarily store, the 8-bit word supplied thereto.

Between successive timing pulses, timing signal generator 18' generates timing pulses $T_{QW}$, as shown in FIG. 4C. These timing pulses are counted from 000 to 111 by a suitable counter (not shown), the count of this counter being supplied as compartment address signals $Q_1$, $Q_2$ and $Q_3$ during the write-in cycle. In addition, timing pulses $T_1$ are counted by another counter (not shown) whose count is used as location address signals $Q_4$-$Q_{11}$ during the write-in cycle. Thus, when the first sample is obtained, a first location is addressed. During the sampling interval, compartment address signals $Q_1$-$Q_3$ are incremented from 000 to 111. The least significant bit of the 8-bit sample is stored in compartment 000 of the addressed storage location, the next more significant bit is stored in compartment 001, and so on, until the most significant bit is stored in compartment 111. These compartment address signals also are supplied to selector circuit 25 for serializing the 8-bit sample and supplying this serialized sample $D_3$ to the RAM in increasing order of bit level significance. Thus, the least significant bit is supplied first, and this least significant bit is stored in addressed compartment 000. Then, the next significant bit is supplied to the RAM and is stored therein in compartment 001. This serialization continues until the most significant bit is supplied to the RAM and is stored in compartment 111 of the addressed storage location. Then, the next sampling pulse is produced to obtain the next sample of the video signal. Compartment address signals $Q_1$-$Q_3$ are generated during this next sampling interval so that the 8-bit sample is serially supplied to RAM 26 and each bit is stored in its associated storage compartment. It is appreciated that, when this next sampling pulse is generated, the location address produced by location address signals $Q_4$-$Q_{11}$ also is incremented.

Therefore, during the write-in cycle, each of the 256 8-bit words is serially supplied to RAM 26 and is stored therein in a respective storage location. All of the bits of the same respective levels are stored in the same compartment in each of the respective storage locations. Thus, all of the least significant bits are stored in storage compartment 000 in their respective storage locations; the next more significant bits all are stored in storage compartment 001 in their respective storage locations, and so on, with all of the most significant bits being stored in storage compartment 111 in their respective storage locations.

During this write-in operation, write/read control pulse $T_4$ exhibits one state, for example, a binary "1". This conditions the RAM for the write-in cycle. At the end of this write-in cycle, that is, at the end of the horizontal line interval, write/read control pulse $T_4$ exhibits its other state, for example, a binary "0", to condition the RAM for a read-out operation during the next line interval. The manner in which this read-out operation is performed now will be described.

Let it be assumed that timing signal generator 18' generates 255 timing pulses over a duration equal to two horizontal line intervals. These timing pulses are illustrated in FIG. 4D, and are seen to be similar to the timing pulses described previously with respect to FIG. 2C. Also, these timing pulses are counted to produce latching pulses $T_5$, shown as the darker pulses in FIG. 4D. These latching pulses are similar to latching pulses $T_2$ (FIG. 2C), except that the 0th pulse is delayed from the termination of the horizontal synchronizing pulse h by one timing pulse period, that is, by 1/255×2H. The counter (not shown) counts these 255 timing pulses so as to produce the latching pulses at the 0th, first, third, seventh, fifteen, thirty-first, sixty-third and one hundred twenty-seventy timing pulses, respectively, as shown in FIG. 4D.

Latching pulses $T_5$ are counted in, for example, a 3-bit counter to produce compartment address signals $Q_1$, $Q_2$ and $Q_3$. This 3-bit counter (not shown) is reset to a count of 000 at the termination of the horizontal synchronizing pulse h, that is, in response to the 255th timing pulse shown in FIG. 4D. Then, in response to the first latching pulse which coincides with the 0th timing pulse, the count of this 3-bit counter, i.e., the compartment address, is incremented to a count of 001. In response to the next latching pulse, i.e., the first timing pulse, the count of the 3-bit counter is incremented to a count of 010. Successive latching pulses, that is, the third, seventh, fifteenth, thirty-first and sixty-third timing pulses increment the count of this 3-bit counter successively until the count of 111 is obtained. This count is retained until the counter is reset in response to the next 255th timing pulse. These compartment address signals are supplied from timing signal generator 18' to RAM 26 during the read-out cycle, that is, when write/read control pulse $T_4$ is a binary "0".

Figure 4E:
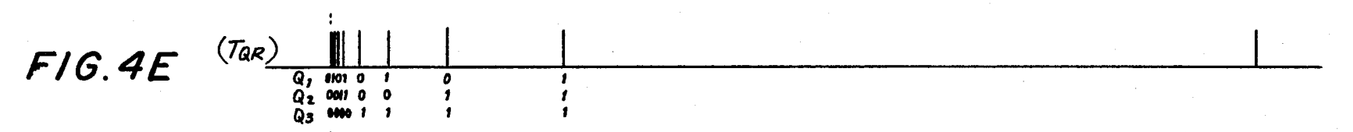

FIG. 4E illustrates timing pulses $T_{QR}$ which are supplied to the aforementioned 3-bit counter for the production of compartment address signals $Q_1$–$Q_3$. As the significance of the bit level stored in the respective compartments addressed by these compartment address signals increases, the spacing, or time-separation, between successive timing pulses $T_{QR}$, likewise increases. A suitable circuit, such as a gated clock circuit, is enabled by each of the timing pulses $T_{QR}$ shown in FIG. 4E to generate 256 shift pulses $T_6$, the envelopes of these shift pulses being shown in FIG. 4F. Shift pulses $T_6$ are supplied to shift register 27 and, in addition, are counted by an 8-bit counter (not shown) to produce location address signals $Q_4$–$Q_{11}$. Thus, the location addressed is incremented from a count of 00000000 to a count of 11111111 by the successive shift pulses $T_6$.

Let it be assumed that a write-in cycle has just been completed and that, therefore, write/read control pulse $T_4$ undergoes a transition from a binary "1" to a binary "0", thereby initiating the read-out cycle. At the start of this read-out cycle, the 255th timing pulse (FIG. 4D) is produced. This resets the aforementioned 3-bit counter to generate the compartment address 000. This means that the compartment in each storage location in RAM 26 at which is stored the least significant bit of each sample is addressed. Immediately following this addressing of the storage compartments in RAM 26, shift pulses $T_6$ (FIG. 4F) are generated. The first shift pulse sets the location address signals $Q_4$–$Q_{11}$ to a count of 00000000, thereby reading out the least significant bit in this storage location to shift register 27. In response to the next shift pulse $T_6$, the location address signals $Q_4$–$Q_{11}$ are incremented to a count of 00000001, thereby reading out the least significant bit in this next storage location to the shift register. This operation continues until all of the least significant bits of all of the 8-bit samples stored in RAM 26 have been read out to shift register 27. Then, when all of these least significant bits are stored in the shift register, the first latching pulse $T_5$, coinciding with the 0th timing pulse (FIG. 4D) is generated to transfer the least significant bits from shift register 27 to latching circuit 20, all in parallel. These least significant bits activate drive circuit 21, whereupon selected ones of the display elements which are positioned in the enabled line of display elements in display panel 22 are energized.

This latching pulse, which is referred to as the least significant bit (LSB) latching pulse, is counted by the aforementioned 3-bit compartment address counter to increment the compartment address signals to a count of 001, as shown in FIG. 4E. Hence, all of the storage compartments in RAM 26 in which the next more significant bit (i.e., bit 2B) of each 8-bit sample is stored are addressed. Immediately following the addressing of this storage compartment, shift pulses $T_6$ are generated so as to serially shift out the 256 next more significant bits from RAM 26 into shift register 27. When all of these next more significant bits (i.e., bit 2B) are stored in the shift register, the next latching pulse $T_5$, referred to as the 2B latching pulse, coinciding with the first timing pulse of FIG. 4D is produced. This transfers these next more significant bits from shift register 27 to latching circuit 20. Hence, the bits of lesser significance, that is, the least significant bits, which had been stored in the latching circuit now are replaced by these bits of next more significance. These bits now stored in latching circuit 20 are supplied to drive circuit 21, whereupon selected ones of the display elements which are disposed in the enabled line of display elements in display panel 22 are energized.

Figure 4F:
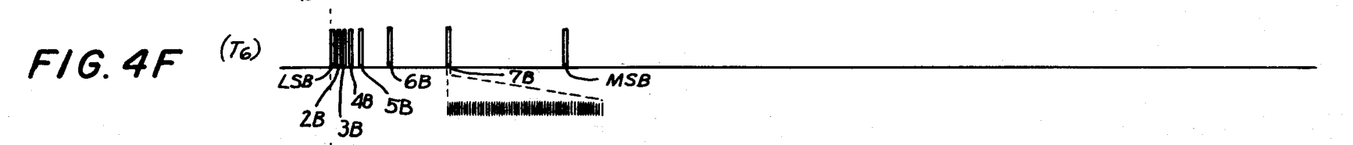

The 2B latching pulse which had just been supplied to latching circuit 20 increments the count of the aforementioned compartment address counter to a count of 010. Thus, the storage compartment in each storage location of RAM 26 in which the next more significant bit (i.e., bit 3B) is stored is addressed. As shown in FIG. 4F, shift pulses $T_6$ are generated so as to serially read out each of the 3B bits from the storage locations in RAM 26 to shift register 27. Then, upon the occurrence of the 3B latching pulse, which coincides with the third timing pulse shown in FIG. 4D, the 3B bits are transferred from shift register 37 to latching circuit 20, thereby displacing the 2B bits which previously had been stored in the latching circuit. These 3B bits are supplied to drive circuit 21 for energizing selected ones of the display elements which are disposed in the enabled line in display panel 22.

Upon the occurrence of the 3B latching pulse, the compartment address is incremented so as to address the storage compartment in each storage location of RAM 26 in which the 4B bit is stored. Shift pulses $T_6$ serially shift these 4B bits from RAM 26 to shift register 27 in which they are temporarily stored until the occurrence of the 4B latching pulse, which is seen to coincide with the seventh timing pulse of FIG. 4D. At that time, the 4B bits are transferred from shift register 27 to latching circuit 20 to displace the previously stored 3B bits therefrom. These 4B bits, now stored in the latching circuit, selectively energize the display elements in the enabled line of display elements of display panel 22.

The 4B latching pulse increments the compartment address signals such that the bits of next higher significance, i.e., the 5B bits, are serially read out of RAM 26 into shift register 27. These 5B bits are stored in the shift register until the occurrence of the 5B latching pulse, which coincides with the fifteenth timing pulse of FIG. 4D. Then, these 5B bits are transferred to latching circuit 20 from which they are used to energize selected ones of the display elements in display panel 22. Furthermore, the 5B latching pulse increments the compartment address such that the bits of next higher significance, i.e., the 6B bits, are read out of RAM 26 to shift register 27. At the next latching pulse, that is, the 6B latching pulse, which coincides with the thirty-first timing pulse of FIG. 4D, the 6B bits are transferred to latching circuit 20 for energizing selected ones of the display elements in display panel 22. The 6B latching pulse also increments the compartment address such that the bits of next higher significance, i.e., the 7B bits, then are serially read out of the RAM into the shift register. The 7B bits are temporarily stored in shift register 27 until the occurrence of the 7B latching pulse, which coincides with the sixty-third timing pulse of FIG. 4D. Then, the 7B bits are transferred from the shift register to latching circuit 20 for selectively energizing the display elements of the display panel. Also, this 7B latching pulse increments the compartment address such that now the bits of next higher significance, i.e., the MSB bits, are serially read out of RAM 26 to shift register 27. These MSB bits are temporarily stored in shift register 27 until the occurrence of the MSB latching pulse, which is seen to coincide with the one hundred twenty-seventh timing pulse of FIG. 4D. At that time, the MSB bits are transferred to latching circuit 20 for selectively energizing the display elements in the enabled line of display panel 22.

It is appreciated that, when the 7B latching pulse is produced, the compartment address signals $Q_1-Q_3$ are incremented to a count of 111. This count is retained until the occurrence of the next 255th timing pulse of FIG. 4D. That is, the MSB latching pulse, which coincides with the one hundred twenty-seventh timing pulse of FIG. 4D, does not change the compartment address. Hence, no further bits are read out of RAM 26 until the commencement of the next read cycle, that is, when write/read control pulse $T_4$ undergoes a transition from binary "1" to binary "0".

From FIG. 4D, it is appreciated that the least significant bit LSB is stored in latching circuit 20, and thus used to energize selected display elements in display panel 22, for a duration equal to one timing pulse period, i.e., $1/255 \times 2H$. The next more significant bit, bit 2B, is stored in latching circuit 20, and used to energize the display elements, for a duration equal to two timing pulse periods, i.e., $2/255 \times 2H$. Bits 3B are stored in latching circuit 20 for a duration equal to $4/255 \times 2H$; bits 4B are stored for a duration $8/255 \times 2H$, bits 5B are stored for a duration $16/255 \times 2H$, bits 6B are stored for a duration $32/255 \times 2H$, bits 7B are stored for a duration $64/255 \times 2H$; and the most significant bits, bits MSB, are stored for a duration $128/255 \times 2H$. Thus, as the significance of the bit levels of the bits stored in latching circuit 20 increases, the duration that such bits are stored correspondingly increases so as to increase the duration that the selected display elements are energized. It is seen that this increases the perceived brightness of the energized bit levels, thereby making the perceived brightness a function of the weight, or bit level, of the stored bits. That is, the significance of the bit levels is represented as a pulse width modulation factor which, in turn, establishes the perceived brightness of the energized display elements.

Figure 4G:
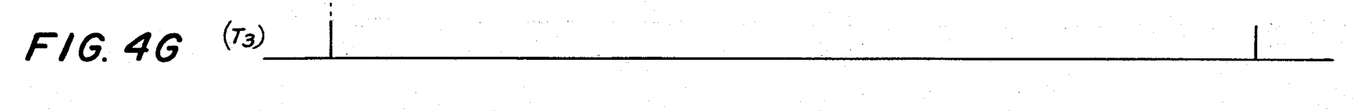

As shown in FIG. 4G, at the beginning of each read-out cycle, that is, at the beginning of each alternate line interval, a pulse $T_3$ is supplied to ring counter 23 to increment this ring counter so as to enable the next line of display elements provided in display panel 22. At the completion of a received field of video signals S, ring counter 23 will be incremented through a complete cycle which would have enabled, in succession, all of the lines of display elements provided in the display panel. Consequently, a video picture derived from one field interval of the received video signal will be displayed by display panel 22 on a line-by-line basis, each line of the displayed video picture being derived from alternate line intervals of the received video signal.

In the aforedescribed embodiment of FIG. 3, it is appreciated that, prior to the generation of a latching pulse associated with a particular bit level, the bits of that bit level should be read out of RAM 26. This reading out of such bits may occur at any time prior to the occurrence of the latching pulse. For example, the 7B latching pulse occurs in coincidence with the sixty-third pulse timing pulse of FIG. 4D. The 7B bits may be read out of RAM 26 at any time following the occurrence of the 6B latching pulse and prior to the 7B latching pulse, i.e., at any time during the interval from the thirty-first to the sixty-third timing pulses of FIG. 4D. It is not necessary that the 7B bits must be read out of RAM 26 immediately following the occurrence of the 6B latching pulse.

In the illustrated embodiment, only a single conducting lead need be provided to supply the serial bits to RAM 26 during the write-in cycle and to read out these bits, in seriatim, to shift register 27 during the read-out cycle. Thus, the number of conductors which must be connected to the RAM are far reduced compared to the conductors which are needed for memory 19 of the example shown in FIG. 1. Furthermore, shift register 27 can be formed of conventional multi-bit shift register chips. For example, in order to accommodate 256 bits, shift register 27 may be formed of eight 32-bit registers, these registers being available commercially in small, integrated circuit construction. These eight separate chips occupy a relatively small space and, therefore, can be readily mounted on the same circuit board as are mounted latching circuit 20, drive circuit 21 and display panel 22. Only a single conducting lead need be provided between RAM 26 and this shift register in order to transfer bits $D_4$ to the shift register. Moreover, RAM 26 may be a conventional integrated circuit random access memory which, even though mounted on a separate circuit board, does not require a complex interconnection to shift register 27 or to any of the other components to which it is connected.

The duration that each of the bits of respective bit-level significance is stored in latching circuit 20 is seen to increase as a factor of 2 as this bit-level significance increases. That is, the duration that bits of a given bit level are stored in the latching circuit is twice as long as the duration that bits of the next lower bit level are stored. If desired, the $\gamma$-characteristic of display panel 22 may be taken into account by modifying this increasing duration for which bits of higher bit-level significance are stored in latching circuit 20. That is, this duration may be slightly greater than or less than twice the duration for which bits of the next lower bit-level significance are stored.

Figure 5:
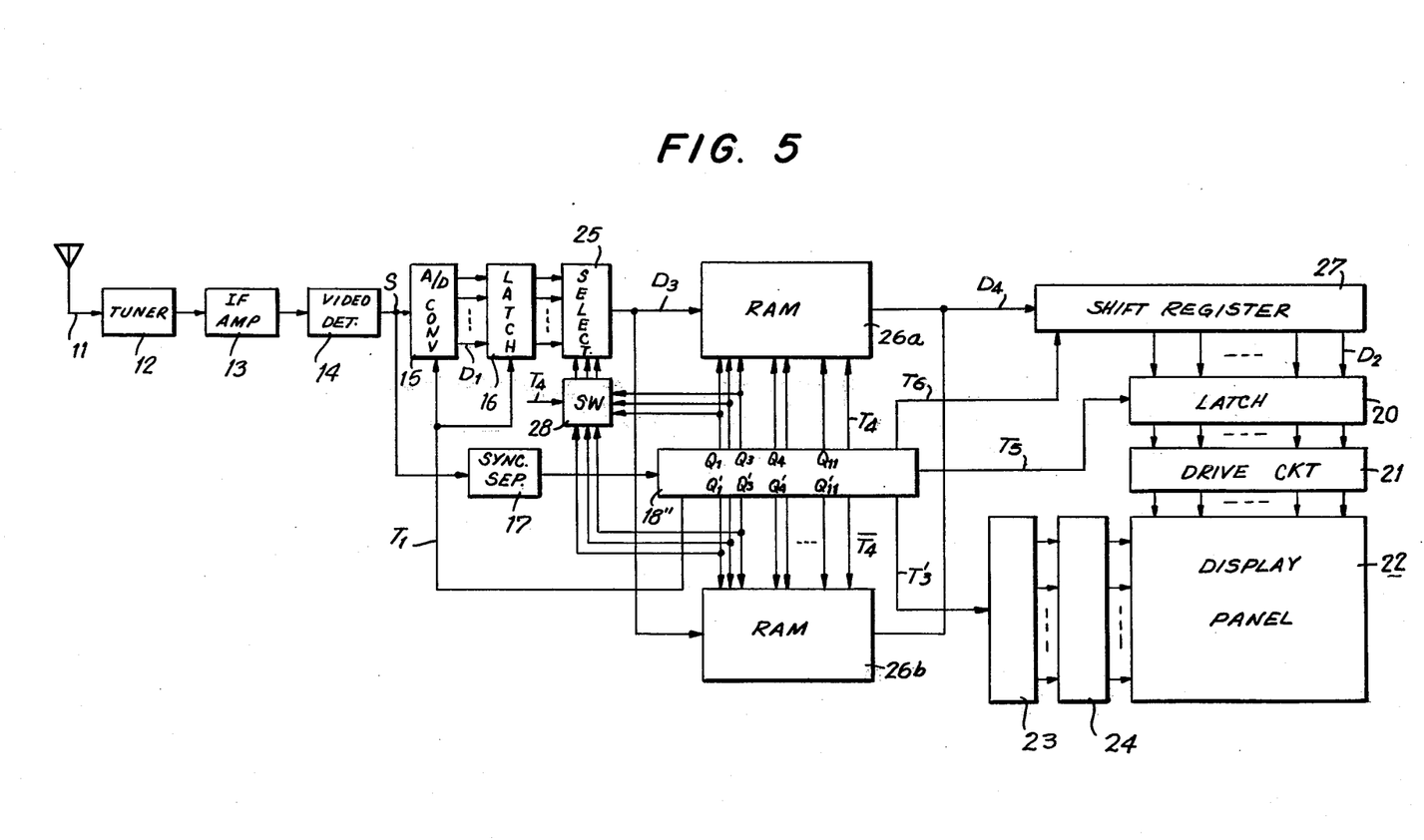
FIG. 5 is a block diagram of another embodiment of the present invention.

In the embodiment shown in FIG. 3, the information content of alternate line intervals is used to obtain a video picture. That is, only alternate line intervals are sampled, these samples being stored in RAM 26 and read out therefrom during those intermediate line intervals in which the sampling operation is not performed. FIG. 5 illustrates an alternative embodiment wherein each line interval is sampled, and the information content of each such sample line interval is displayed on display panel 22. The embodiment of FIG. 5 differs from that of FIG. 3 in that RAM 26 (FIG. 3) is replaced by two separate RAM's 26a and 26b, and timing signal generator 18' (FIG. 3) is replaced by timing signal generator 18" which generates the aforedescribed compartment and location address signal $Q_1$-$Q_3$ and $Q_4$-$Q_{11}$ both for RAM 26a and for RAM 26b. In addition, a switching circuit 28 is connected to selector circuit 25 and is controlled by write/read control pulse $T_4$ to respond to compartment address signals $Q_1$-$Q_3$, which are generated for RAM 26a, and to compartment address signals $Q'_1$-$Q'_3$, which are generated for RAM 26b, to supply one or the other of these RAM's with each 8-bit sample. Both RAM 26a and RAM 26b are connected to shift register 27 to serially supply the respective bits read out from the RAM's to this shift register, these RAM's being additionally controlled by complementary write/read control pulses $T_4$ and $\overline{T}_4$ such that when, for example, RAM 26a is operated in its write-in cycle, RAM 26b is operated in its read-out cycle, and vice versa. Still further, timing signal generator 18" supplies timing pulses $T'_3$ to ring counter 23, these timing pulses being generated at the horizontal line frequency rate such that the line of display elements in display panel 22 are enabled, in sequence, at this horizontal line frequency.

The operation of the embodiment shown in FIG. 5 is similar to the aforedescribed operation of the embodiment of FIG. 3, except that timing pulses $T_1$, which are used for sampling, are generated during each horizontal line interval, and the frequency of the timing pulses shown in FIG. 4D is doubled. By doubling the frequency of the timing pulses of FIG. 4D, RAM 26a, and then RAM 26b, are read out alternately such that the sampled video signal obtained during each line interval is supplied to shift register 27 during the next following line interval. Hence, during a given line interval wherein, for example, RAM 26a is supplied with the sampled video signal, the contents of RAM 26b are read out to shift register 27 in the manner discussed previously. Then, during the next line interval, the sampled video signal is written into RAM 26b while the contents of RAM 26a are read out to the shift register. When write/read control pulse $T_4$ is, for example, a binary "1", switching circuit 28 operates selector circuit 25 to supply each 8-bit sample to RAM 26a. Also, this write/read control pulse conditions RAM 26a for a write-in operation, and its complementary control pulse $\overline{T}_4$ conditions RAM 26b for a read-out operation. At the next line interval, write/read control pulse $T_4$ is a binary "0" to operate switching circuit 28 to supply each 8-bit sample from selector circuit 25 to RAM 26b. This control pulse $T_4$ now conditions RAM 26a for a read-out operation, and its complement $\overline{T}_4$ conditions RAM 26b for a write-in operation.

It is appreciated that, in the embodiment of FIG. 5, each latching pulse $T_5$ still is produced at the 0th, first, third, seventh, fifteenth, thirty-first, sixty-third and one hundred twenty-seventh timing pulse of FIG. 4D. Of course, since the frequency of these timing pulses is doubled, the time duration between successive latching pulses is reduced by one-half. This means that the frequency of the shift pulses $T_6$ must be doubled. Nevertheless, the durations that the bits of different respective bit level significance are stored in latching circuit 20 increases from a minimum to a maximum duration as the bit level significance increases. This duration is one-half the duration that bits of corresponding bit-level significance are stored in the latching circuit in the embodiment of FIG. 3.

Figure 6:
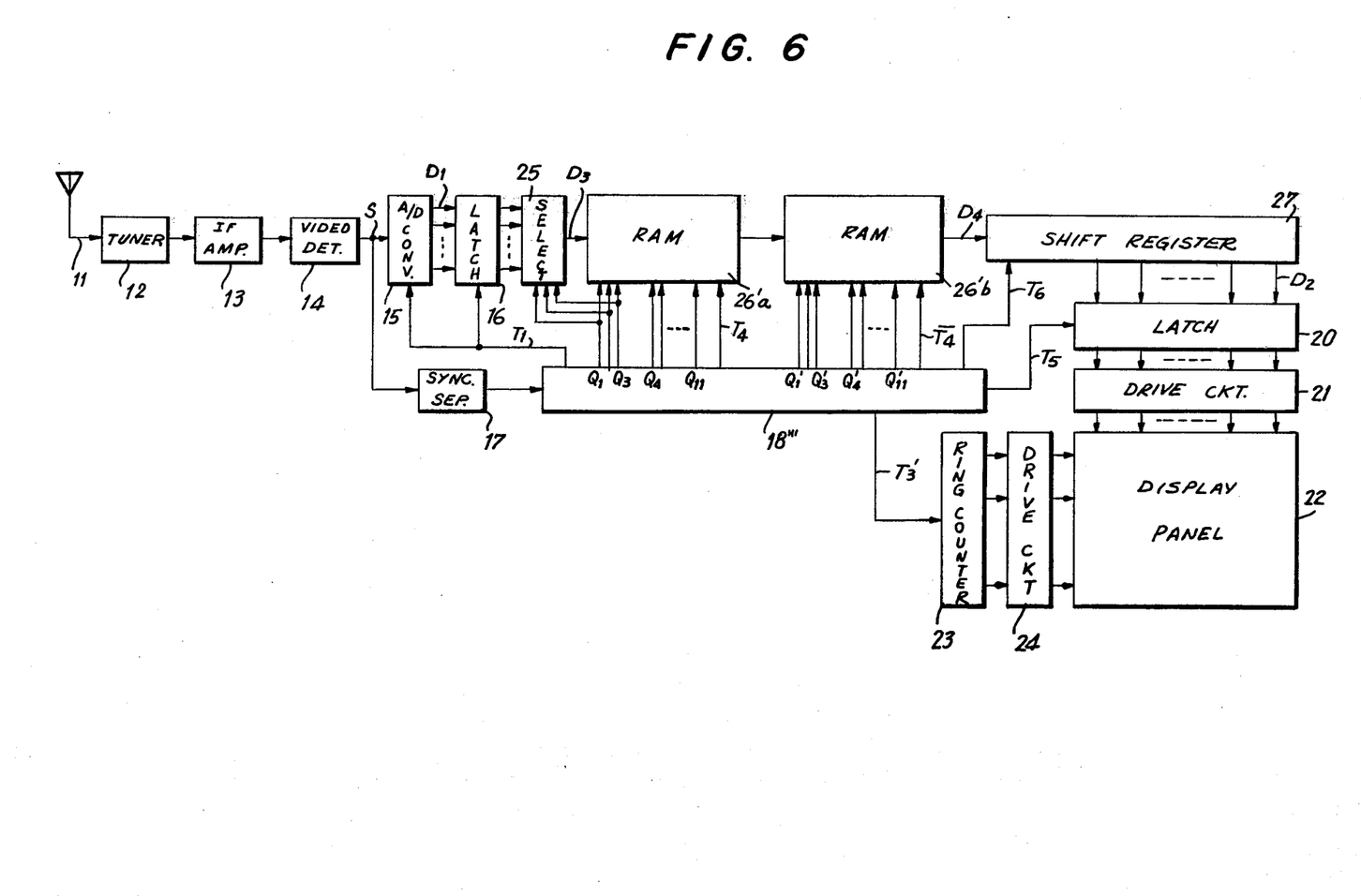
FIG. 6 is a block diagram of yet another embodiment of the present invention.

The embodiment of FIG. 6 is yet another alternative wherein the information content of such line interval is sampled and displayed on display panel 22. In this embodiment, the memory device is comprised of RAM's 26'a and 26'b which are connected to each other in serial relationship. Timing signal generator 18''' is used to generate write-in compartment addresses $Q_1$-$Q_3$ and write-in location addresses $Q_4$-$Q_{11}$; as well as read-out compartment addresses $Q'_1$-$Q'_3$ and read-out location addresses $Q'_4$-$Q'_{11}$. The write-in addresses all are supplied to RAM 26'a, while the read-out addresses all are supplied to RAM'b. RAM 26'a is connected to selector circuit 25 to receive the serialized 8-bit samples therefrom. The output of RAM 26'a is connected to RAM 26'b and is adapted to transfer, at high speed, the sample video signal contained therein.

Timing pulses $T_1$, which are used in A/D converter 15 to sample the incoming video signal S, are generated by timing signal generator 18''' during each line interval. RAM 26'a is operated, during its write-in cycle, in the same manner as RAM 26, discussed in detail above. Hence, each sample of video signal S, which is obtained during each line interval, is written into RAM 26'a. During the horizontal blanking interval which separates two successive line intervals, the contents of RAM 26'a, that is, the samples (.e.g. 256 samples) of the just-completed line interval of video signal S are transferred at high speed to RAm 26'b whereat they are stored in the same storage locations as in RAM 26'a. Then, during the next line interval in which RAM 26'a undergoes another write-in cycle, RAM 26'b undergoes a read-out cycle, whereby all of the samples of the preceding line interval of video signal S are serially read out to shift register 27. Of course, in the embodiment of FIG. 6, the read-out cycle of RAM 26'b is carried out over one line interval, as in the aforedescribed read-out cycles of each of RAM's 26a and 26b of FIG. 5, rather than over a duration equal to two line intervals, as in the operation of the embodiment shown in FIG. 3. Hence, in the FIG. 6 embodiment, the timing pulses which are used to generate the compartment address signals admit of a frequency which is twice the frequency of the timing pulses shown in FIG. 4D. Nevertheless, as the significance of the bit levels which are read out of RAM 26'b increases, the delay in reading out such bit levels correspondingly increases. Hence, the duration that each bit level is stored in latching circuit 20 increases with the significance of the bit level. That is, the least significant bits are stored in latching circuit 20 for a minimum duration, while the most significant bits are stored in the latching circuit for a maximum duration.

Since each line interval of the incoming video signal is sampled, the frequency of timing pulses T'₃ supplied to ring counter 23 is equal to the horizontal line frequency. As an example, display panel 22 shown in FIGS. 5 and 6 may include 240 lines of display elements, in order to display each useful line interval of the incoming video signal; whereas display panel 22 of FIG. 3 may be comprised of 120 lines of display elements for displaying only alternate useful lines of the video signal.

While the present invention has been particularly shown and described with reference to certain preferred embodiments, it should be readily apparent to those of ordinary skill in the art that various changes and modifications in form and details may be made without departing from the spirit and scope of the invention. For example, it has been assumed that each sample is written into RAM 26 (or to RAM's 26a, 26b or 26'a) from the least significant bit toward the most significant bit, and that these bits are read out in the same sequence. If desired, these bits may be written into, and thus read out of, the RAM's on the basis of decreasing bit-level significance. That is, the most significant bit, followed by the bit of next lesser significance, and so on, may be written into the RAM, and all of the bits of most significance, followed by all of the bits of lesser significance, and so on, may be read out of the RAM's. This means that latching pulses T₅, as shown in FIG. 4D, would be separated from each other by decreasing time durations, that is, the mirror image of the representation shown in FIG. 4D.

In addition, although it has been assumed that 256 samples are obtained during alternate (or each) line interval, it should be appreciated that, if desired, any number m of samples can be obtained; and that the number of bits n which are used to represent each sample may be less than or greater than eight.

Still further, timing signal generator 18' may be constructed of gating circuits, such as a plurality of AND gates, for generating the respective compartment and location addresses during the write-in and read-out cycles, respectively; and separate clock signal generators for generating appropriate clock signals during write-in and read-out cycles, which clock signals are divided to appropriate frequencies for generating the various sampling, latching, shift and address pulses which have been discussed above.

It is intended that the appended claims be interpreted as including these as well as other changes and modifications.

What is claimed is:

1. Video display apparatus having a flat X-Y matrix display panel comprised of an X-Y array of display elements for displaying a picture derived from a video signal, comprising:

analog-to-digital converting means for obtaining m samples of a line of said video signal, each sample being formed of n bits of different bit levels from the least significant bit level to the most significant bit level;

memory means for storing each sample in a respective one of m storage locations, each said storage location including n storage compartments for storing said n bits of a sample, respectively;

read-out means for serially reading out all of the bits of one level from the corresponding storage compartment in all of said n storage locations, and then for serially reading out all of the bits of the next level from the corresponding storage compartment in all of said m storage locations, and so on, in succession, until the bits of all levels have been read out from said m storage locations;

enabling means for enabling successive lines of said display elements in said display panel to be energized sequentially on a line-by-line basis; and energizing means supplied in parallel with the m bits of each bit level, sequentially by level, read out from said storage locations for energizing selected ones of the display elements in an enabled line in accordance with the bit values of the read out bits.

2. The apparatus of claim 1 wherein said read-out means includes read-out compartment address means for addressing, in sequence, corresponding storage compartments in all of said m storage locations, from the storage compartment in which the least significant bit is stored to the storage compartment in which the most significant bit is stored; and read-out location address means for successively addressing all of said m storage locations during the interval that a compartment is addressed; whereby all of the least significant bits of the m stored samples first are serially read out, then all of the next most significant bits of the m stored samples are serially read out, until all of the most significant bits of the m stored samples are serially read out.

3. The apparatus of claim 2 wherein said read-out means further comprises timing means for generating read-out timing pulses spaced apart from each other by progressively increasing intervals; and wherein said read-out timing pulses increment said compartment address means, whereby the delay from the time that one storage compartment is addressed until the time that the next storage compartment is addressed increases as the significance of the bits stored in said respectively addressed storage compartments increases.

4. The apparatus of claim 3 further comprising temporary storage means including m bit-storage locations for serially receiving and temporarily storing the m bits read out of said memory means when a storage compartment is addressed, and for supplying said m bits in parallel to said energizing means, whereby the duration that said m bits are supplied to said energizing means increases as the significance of said m bits increases.

5. The apparatus of claim 4 wherein said temporary storage means comprises m-stage shift register means for receiving the m serially read out bits from said memory means, said shift register means having m parallel outputs; and latch means having m inputs coupled to said m outputs and responsive to said read-out timing pulses for receiving, in parallel, the m bits in said shift register means, said latch means having m outputs coupled to said energizing means for supplying the received m bits thereto.

6. The apparatus of claim 5 wherein said video signal includes horizontal synchronizing signals; and wherein said enabling means comprises counting means; horizontal synchronizing separator means for separating said horizontal synchronizing signals from said video signal to increment the count of said counting means; and means for enabling a line of display elements as determined by said count of said counting means.

7. The apparatus of claim 6 wherein said analog-to-digital converting means comprises sampling means for sampling said video signal, and a source of sampling pulses for supplying said sampling pulses to said sampling means; and further comprising write-in compartment address means operative during the interval between successive sampling pulses for addressing, in sequence, n storage compartments of an addressed storage location into which storage compartments the n bits of the sample obtained by said analog-to-digital converting means are written, and write-in location address means incremented in response to said sampling pulses for addressing successive storage locations of said memory means.

8. The apparatus of claim 7 wherein said sampling means is operative during alternate line intervals to sample alternate lines of said video signal; and wherein said read-out compartment address means and said read-out location address means are operative during those line intervals that said sampling means is not operative.

9. The apparatus of claim 8 wherein the count of said counting means included in said enabling means is incremented in response to alternate ones of the separated horizontal synchronizing signals; whereby picture information contained in alternate lines of said video signal is displayed.

10. The apparatus of claim 7 wherein said memory means comprises first and second random access memories (RAM's); and switch means for selecting said first RAM into which the n bits of each sample obtained by said analog-to-digital converting means during a first line of said video signal are written and for selecting said second RAM into which the n bits of each sample obtained by said analog-to-digital converting means during the next following line of said video signal are written; and wherein said read-out compartment address means and said read-out location address means are operative to read out the n x m bits stored in said second RAM when said first RAM is selected by said switch means and to read out the n x m bits stored in said first RAM when said second RAM is selected by said switch means; whereby picture information contained in each line of said video signal is displayed.

11. The apparatus of claim 7 wherein said memory means comprises first and second random access memories (RAM's), said first RAM being coupled to said analog-to-digital converting means for receiving the n bits of each sample obtained by said analog-to-digital converting means during each line of said video signal and said second RAM being coupled to said first RAM for the high speed transfer of the n x m bits stored in said first RAM to said second RAM during each horizontal blanking interval of said video signal; and wherein said read-out compartment address means and said read-out location address means are operative during each line of video signals to address the storage compartments and the storage locations in said second RAM.

12. Video display apparatus having a flat X-Y matrix display panel comprised of an X-Y array of energizable display elements for displaying a picture derived from a video signal, the latter being constituted by horizontal line intervals containing video information and horizontal synchronizing signals disposed in horizontal blanking intervals which separate successive line intervals, said apparatus comprising:
analog-to-digital converting means for obtaining m samples of a line of said video signal, each sample having n bits of different bit levels from the least significant bit level to the most significant bit level;
random access memory (RAM) means having m storage locations for storing said m samples, each storage location containing n storage compartments for storing the n bits of a sample;
write-in means for writing each sample from said analog-to-digital converting means into said RAM means;
compartment addressing means for addressing successive storage compartments, in sequence, in said RAM means;
location addressing means for addressing m successive storage locations, in sequence, in said RAM means when each storage compartment is addressed for serially reading out a group of m bits, all of the same bit level, when a first storage compartment is addressed and then for serially reading out a group of m bits, all of the same next bit level, when the next storage compartment is addressed and so on until n groups of m bits are serially read out of said RAM means;
shift register means for serially receiving each group of m bits serially read out of said RAM means;
enabling means for enabling successive lines of said display elements in said display panel to be energized on a line-by-line basis; and
energizing means supplied with each group of m bits, in parallel, from said shift register means for energizing selected ones of the display elements in an enabled line in accordance with the bit values of each group.

13. The apparatus of claim 12 further comprising timing means for generating, during predetermined periods, timing pulses separated from each other by progressively increasing time intervals, said timing pulses being used to increment said compartment addressing means; and wherein said compartment addressing means addresses, in order, storage compartments in which bits of increasing bit level significance are stored; whereby bits of greater bit level significance are stored in said shift register means for a longer duration than bits of lesser bit level significance.

14. The apparatus of claim 13 wherein said energizing means comprises latch means responsive to said timing pulses for temporarily storing each group of m bits received by said shift register so as to enable said shift register to receive the next group of m bits from said RAM means; and wherein each timing pulse is used to transfer a group of m bits from said shift register to said latch means, to increment the address of said compartment addressing means, and to commence the reading out from all of said storage locations the respective bit stored in the addressed storage compartment.

15. The apparatus of claim 14 wherein said enabling means comprises ring counter means incremented in response to horizontal synchronizing signals contained in said video signal to enable the line of display elements determined by the condition of said ring counter means.

16. The apparatus of claim 15 wherein said RAM means comprises first and second RAM's for receiving the samples from said analog-to-digital converting means during alternate line intervals, respectively; and wherein n successive groups of m bits are read out to said shift register means from said second RAM when samples are written into said first RAM, and n successive groups of m bits are read out to said shift register means from said first RAM when samples are written into said second RAM.

17. The apparatus of claim 15 wherein said RAM means comprises first and second serially-connected RAM's, said first RAM having the samples from said analog-to-digital converting means written therein during each line interval, the n groups of m bits stored in said first RAM being transferred to said second RAM during each horizontal blanking interval, and n successive groups of m bits transferred to said second RAM being read out to said shift register means during each line interval.

18. The apparatus of claim 16 or 17 wherein said ring counter means is incremented in response to each horizontal synchronizing signal, whereby the video information contained in each line interval is displayed.

* * * * *